US005802276A

United States Patent [19]
Benantar et al.

[11] Patent Number: 5,802,276
[45] Date of Patent: Sep. 1, 1998

[54] INFORMATION HANDLING SYSTEM, METHOD, AND ARTICLE OF MANUFACTURE INCLUDING A VAULT OBJECT FOR ENCAPSULATION OF OBJECT SECURITY CREDENTIALS

[75] Inventors: Messaoud Benantar, Poughkeepsie, N.Y.; George Robert Blakley, III; Anthony Joseph Nadalin, both of Austin, Tex.

[73] Assignee: International Business Machines Corporation, Armonk, N.Y.

[21] Appl. No.: 582,551

[22] Filed: Jan. 3, 1996

[51] Int. Cl.$^6$ .................................................. G06F 11/00
[52] U.S. Cl. ............................................ 395/186; 380/23
[58] Field of Search ......................... 395/186, 188.01, 395/187.01, 609, 614, 670, 674, 677, 678; 380/3, 4, 23, 25; 707/9, 103

[56] References Cited

U.S. PATENT DOCUMENTS

| | | | |
|---|---|---|---|
| 5,136,712 | 8/1992 | Perazzoli, Jr. et al. | 395/700 |
| 5,265,221 | 11/1993 | Miller | 395/725 |
| 5,297,283 | 3/1994 | Kelly, Jr. et al. | 395/600 |
| 5,335,346 | 8/1994 | Fabbio | 395/600 |
| 5,343,554 | 8/1994 | Koza et al. | 395/13 |
| 5,369,702 | 11/1994 | Shanton | 380/4 |
| 5,504,814 | 4/1996 | Miyahara | 380/4 |
| 5,577,252 | 11/1996 | Nelson et al. | 395/670 |
| 5,598,562 | 1/1997 | Cutler et al. | 395/674 |
| 5,613,148 | 3/1997 | Bezviner et al. | 395/800 |

*Primary Examiner*—Joseph Palys
*Attorney, Agent, or Firm*—Jenkens & Gilchrist; George E. Clark; Mark S. Walker

[57] ABSTRACT

A system, method and article of manufacture for improving object security in distributed object systems, in an information handling system employing object oriented technology, includes one or more workstations, each workstation having one or more processors, a memory system, an input/output subsystem which may include one or more input/output controllers, each controlling one or more input/output devices, such as communications devices, cursor control devices, keyboards, and display devices, an operating system program such as the OS/2 multi-tasking operating system (OS/2 is a registered trademark of International Business Machines Corporation), and an object oriented control program such as the Distributed System Object Method (DSOM) program available from International Business Machines Corporation, wherein the object oriented control program includes a vault object containing security credentials for objects in the distributed system.

12 Claims, 2 Drawing Sheets

INFORMATION HANDLING SYSTEM, METHOD, AND ARTICLE OF MANUFACTURE INCLUDING A VAULT OBJECT FOR ENCAPSULATION OF OBJECT SECURITY CREDENTIALS

TECHNICAL FIELD OF THE INVENTION

The present invention relates to information handling systems, methods and articles of manufacture, and more particularly to information handling systems, methods and articles of manufacture for enhancing object security in an object oriented system.

BACKGROUND OF THE INVENTION

There is a need to improve security in object oriented systems. The Object Management Group (OMG), an industry consortium seeking to define standard interfaces for computing with objects in distributed and nondistributed environments, has requested solutions to object security problems in distributed object systems. More specifically, object security services (OSS) should comply with the OMG Common Object Request Broker (CORBA) specifications.

The basic security problem facing distributed object systems is someone masquerading under another identity in order to gain access to service to which that person is not authorized. More specifically, the association of a user or application service security credentials with its address space at run time and the management of these security constructs must be handled in such a way as to isolate end users and applications.

As used herein, a principal is an active entity, such as a user or a server, capable of engaging in an authentication process, that is holding an identity and a secret to prove it.

The system needs to create security constructs and make use of them when requests for services by a user are issued, assuring that a correct and authenticated identity will be associated with each request.

PRIOR ART

In the prior art there are many techniques for improving object oriented programming systems (OOPS).

The following are examples of the prior art.

U.S. Pat. No. 4,525,780 teaches a data processing system having a memory organized into objects, where the system uses a protection technique to prevent unauthorized access to objects by users which are identified by a subject number identifying the user, a process for executing a user's procedure and the type of system operation to be performed by the user's procedure. An access control list is maintained to control access to objects based on subject identifier.

U.S. Pat. No. 5,136,712 teaches an object based operating system for a multitasking computer system including means for making an object private to a process. Access to a private object is controlled by an access control list.

U.S. Pat. No. 5,265,221 teaches an access control mechanism for granting, revoking, and denying authorization to objects using a system of verbs, parameters, attributes and functions.

U.S. Pat. No. 5,297,283 and U.S. Pat. No. 5,321,841 appear to teach the same system as U.S. Pat. No. 5,136,712 discussed above.

U.S. Pat. No. 5,093,914 generally teaches a method used by a digital computer in controlling execution of an object oriented program to effect a defined action, for example, stopping the program when a specified virtual function is invoked on a specified object during execution of the program.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patents generally deal with methods for protecting access to objects in object oriented programs, the patents do not teach nor suggest creating a vault in an object oriented system to encapsulate object security credentials as is taught and claimed herein with reference with the present invention.

There is a need to automatically add object services features, for example, persistence, recoverability, concurrency and security to a binary class. A related copending patent application Ser. No. 08/537,648 teaches and claims automatically inserting object services into binary classes in an object oriented system. The teaching of U.S. patent application Ser. No. 08/537,648 are incorporated by reference herein. Sometimes the source code of a class is not available for modification. Even when the source code is available, a considerable reprogramming effort is required to add the object services features.

SUMMARY OF THE INVENTION

It is an object of the present invention to improve object security in distributed object systems by encapsulating security credentials of objects in a vault object.

Accordingly, a system, method and article of manufacture, for improving object security in distributed object systems, in an information handling system employing object oriented technology, includes one or more workstations, each workstation having one or more processors, a memory system, an input/output subsystem which may include one or more input/output controllers, each controlling one or more input/output devices, such as communications devices, cursor control devices, keyboards, and display devices, an operating system program such as the OS/2 multi-tasking operating system (OS/2 is a registered trademark of International Business Machines Corporation), and an object oriented control program such as the Distributed System Object Method (DSOM) program available from International Business Machines Corporation, wherein the object oriented control program includes a vault object containing security credentials for objects in the distributed system.

It is an advantage of the present invention that object security in distributed object systems is improved by encapsulating security credentials of objects in a vault object.

DETAILED DESCRIPTION OF A PREFERRED EMBODIMENT OF THE INVENTION

Figure 1:
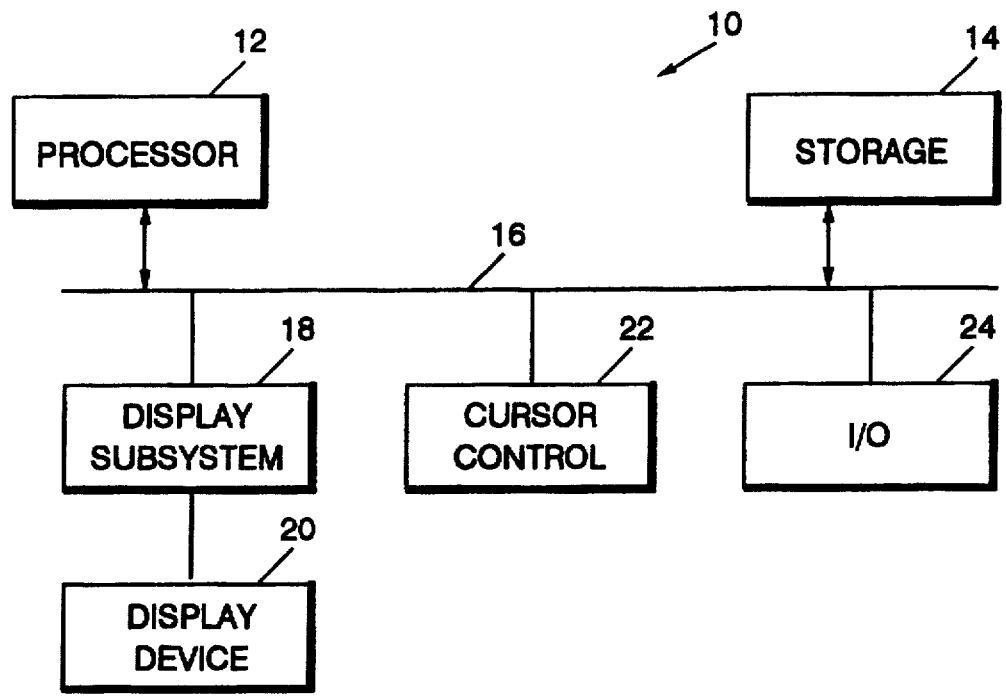
FIG. 1 is a block diagram of a system implementing the present invention.
Figure 2:
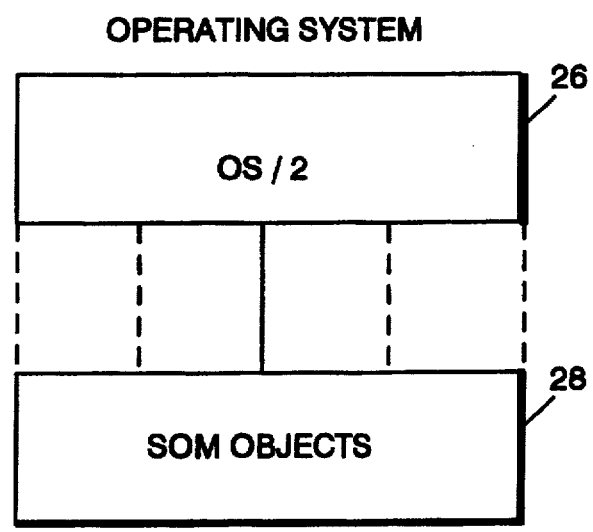
FIG. 2 is a block diagram showing the operating system platform and system object model program supporting the present invention.

Referring now to FIGS. 1 and 2, on information handling system 10 and an operating system environment for the present invention will be described.

Information handling system 10 may be a graphics work station or the like with one or more processors 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multi-tasking operating system such as OS/2* (OS/2 is a registered trademark of International Business Machines Corporation). Among many tasks which the OS/2 operating system controls in operating information handling system 10, is execution of an object oriented program, such as, DSOM Objects program, which is a commercially available product of International Business Machines Corporation.

The method of the present invention may be incorporated in the DSOMObjects program.

In accordance with the present invention, access control to objects of a binary class are provided by the Secure object service. The Secure object service according to the present invention will be described.

The way the user specifies security is to specify the following constraints when searching for a class object:
  name: secure
  value: A boolean indicating whether the object is protected by access control checking.
  name: ACL
  value: If secure==TRUE, an access control list.

When granularity is per method, enforcement can be done either per method invocation or when a reference is first obtained (the capability approach). The capability approach can be implemented by building a security proxy object in the server for each combination of object and ACL (list of allowed methods) that has only the subset of methods that are allowed. The ORB (or at least the server object) would have to be modified to do this.

Figure 3:
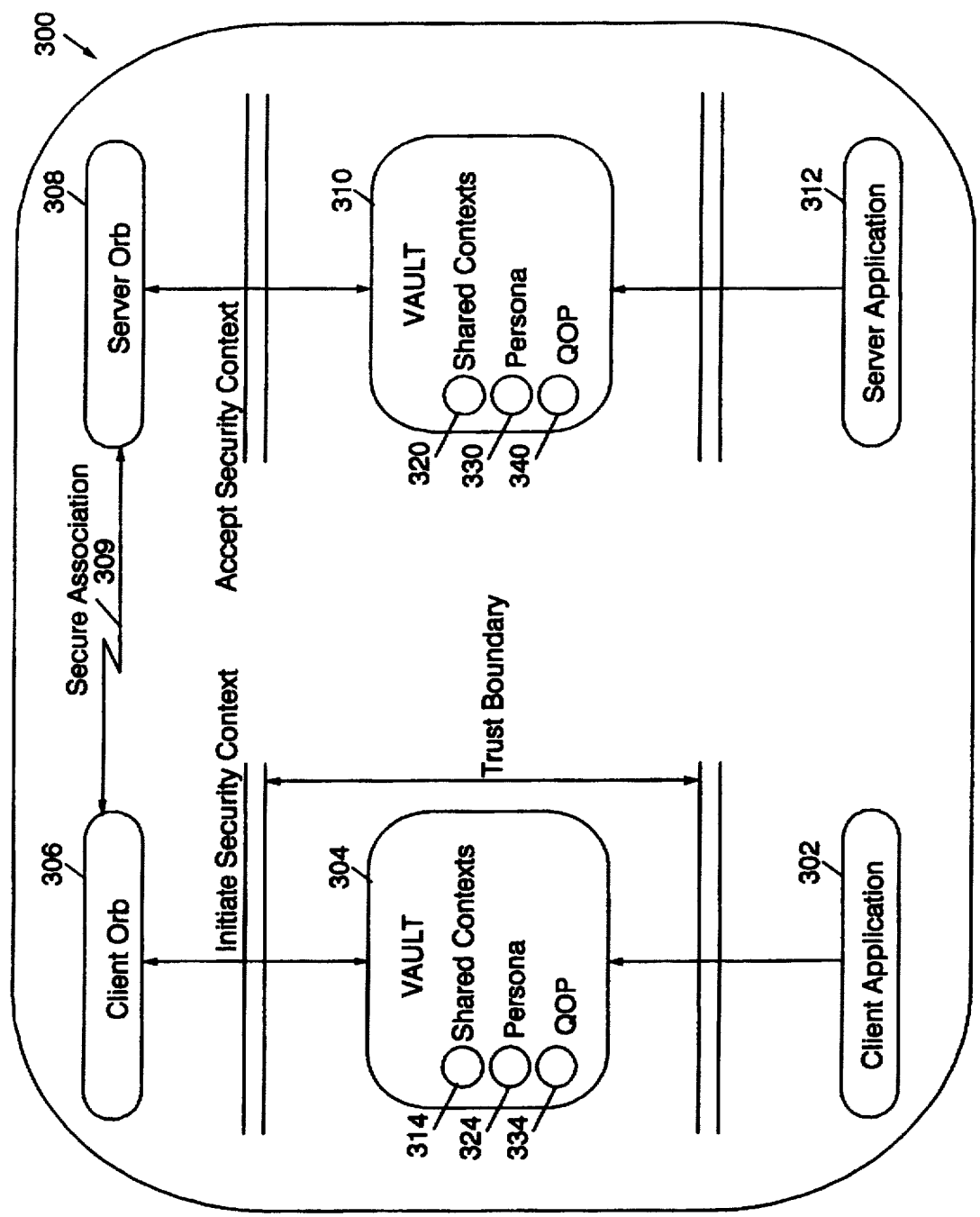
FIG. 3 is a schematic diagram of a distributed object system embodying the present invention.

Referring now to FIG. 3, a distributed object system including a security mechanism in accordance with the present invention will be further described.

A run time object named vault is created in DSOM which provides an interface to the DSOM ORB to retrieve and manipulate security credentials within its scope. These include the persona and the shared security context objects.

The persona object represents an authenticated identity, that is, the identity associated with the owner of the executing process or address space, known as a principal. It is created as a result of the principal providing a secret key proving its right to the account defined by OSS for that principal. A persona maintains information for an established security context local to the principal's address space or process. The persona object includes pointers to the privileges and capabilities of its principal, and to information on the quality of message protection and types of underlying mechanisms providing for the security services at the disposition of its principal. The principal's privileges and capabilities represent the scope of its authority to invoke requests on objects residing in some other address spaces. A persona is created during the DSOM run time initialization. The creation of the persona is transparent to its principal. When successfully created, the state of a persona is maintained within the vault object, and an opaque handle is returned to the local DSOM ORB. Later, a persona may be referred to by the DSOM ORB through its handle and can be manipulated by invoking methods on the vault object only.

SHARED SECURITY CONTEXT

Whereas the persona object represents a relationship between a principal and its local address space, the shared security context object represents a security association between two principals across two address spaces (see FIG. 3). This association plays two roles. The first is the authentication of the client to the server and perhaps from the server to the client in case requiring mutual authentication. The second role defines the methods used to protect messages exchanged between the two parties. Additionally, a shared security context carries the client's privileges and/or capabilities that the server application uses to control access to its protected objects.

The authentication portion of the shared security context may contain a secret key of the client or some token generated by a third party network security service encrypted in the server's secret key and which was created through a series of steps, the first of which requires the secret key of the client. The message protection information carried in the shared security context consists of a quality of protection desired by the client that includes the message integrity level, level of message privacy, and possibly the use of a particular algorithm corresponding to each of these protection levels. Further, the shared security context carries a flag indicating the type of mechanism providing for security services. Information encapsulated by a shared security context object is set by the client, and upon its receipt, a server may accept or reject it. It is always rejected upon the failure to authenticate the client and may also be rejected when the server does not support any of the security services indicated by the client, such as a particular level of message protection.

The client ORB 306 invokes a method on the vault object 304 to initiate a shared security context. Vault 304 creates a shared security context object 314 and returns its information in a token, along with an opaque handle that client ORB 306 uses to refer to that shared context 314. The token is then sent by client ORB 306 to the server ORB 308 over secure association 309. Server ORB 308 will attempt to validate the token by issuing an accept shared context method on server vault 310. Upon acceptance, a secure association between client 306 and server 308 is established. ORBs 306 and 308 both use the corresponding shared context handles to secure communications thereafter.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A method for improving object security in an information handling system employing object oriented technology, comprising the steps of:
  creating one or more vault objects for encapsulating security relevant objects;
  retrieving security credentials associated with an owner of a process;
  examining retrieved security credentials against security relevant objects in the vault to determine if the owner of the process is authorized for access to data related to the encapsulated security relevant objects; and
  creating a persona object, representing an authenticated identity, the personal object comprising pointers to privileges and capabilities of the owner.

2. A method according to claim 1, wherein the persona object further comprises:
  information for an established security context local to the owner's address space or process; and information on the quality of message protection and types of underlying mechanisms providing for the security services available to the owner.

3. A method according to claim 1, wherein the step of creating the persona object further comprises the steps of:
providing a secret key evidencing a right of the owner to an account defined for the owner.

4. A method according to claim 1, further comprising the steps of:
creating one or more shared security context objects, each representing a security association between two or more owners across two or more address spaces.

5. A computer readable medium comprising means for improving object services in an information handling system employing object oriented technology, comprising:
means for creating one or more vault objects for encapsulating security relevant objects;
means for retrieving security credentials associated with an owner of a process;
means for examining retrieved security credentials against security relevant objects in the vault to determine if the owner of the process is authorized for access to data related to the encapsulated security relevant objects; and
means for creating a persona object, representing an authenticated identity, the persona object comprising pointers to privileges and capabilities of the owner.

6. A computer readable medium, according to claim 5, wherein the persona object further comprises:
information for an established security context local to the owner's address space or process; and
information on the quality of message protection and types of underlying mechanisms providing for the security services available to the owner.

7. A computer readable medium, according to claim 5, wherein the means for creating the persona object further comprises:
means for providing a secret key evidencing a right of the owner to an account defined for the owner.

8. A computer readable medium, according to claim 5, further comprises:
means for creating one or more shared security context objects, each representing a security association between two or more owners across two or more address spaces.

9. An information handling system, comprising:
one or more processors;
a storage system;
one or more I/O controllers;
a system bus, operatively connecting the processors, the storage system and the I/O controllers;
a system control program for controlling the operation of the system;
means for creating one or more vault objects for encapsulating security relevant objects;
means for retrieving security credentials associated with an owner of a process;
means for examining retrieved security credentials against security relevant objects in the vault to determine if the owner of the process is authorized for access to data related to the encapsulated security relevant objects; and
means for creating a persona object, representing an authenticated identity, the persona object comprising pointers to privileges and capabilities of the owner.

10. An information handling system, according to claim 11, further comprising:
information for an established security context local to the owner's address space or process; and
information on the quality of message protection and types of underlying mechanisms providing for the security services available to the owner.

11. An information handling system, according to claim 11, further comprising:
means for providing a secret key evidencing a right of the owner to an account defined for the owner.

12. An information handling system, according to claim 9, further comprising:
means for creating one or more shared security context objects, each representing a security association between two or more owners across two or more address spaces.

* * * * *